Patented Sept. 4, 1934

1,972,095

UNITED STATES PATENT OFFICE 1,972,095

DYESTUFF OF THE ANTHRAQUINONE-ACRIDONE SERIES

Ivan Gubelmann and Robert J. Goodrich, South Milwaukee, and William Dettwyler, Milwaukee, Wis., assignors to E. I. du Pont de Nemours & Company, Wilmington, Del., a corporation of Delaware No Drawing. Application November 16, 1931, Serial No. 575,478

13 Claims. (Cl. 260—37)

This invention relates to novel dyestuffs of the anthraquinone-acridone series. It is an object of this invention to produce novel brown to khaki vat dyestuffs possessing valuable dyeing characteristics. Other and further objects of this invention will become apparent as the description proceeds.

In copending application, Serial No. 575,477 by two of us, we have described a series of novel halogenated anthraquinonyl-imino derivatives of anthraquinone-diacridone, having the general formula

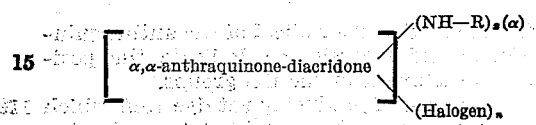

wherein α,α refer to the positions of the NH groups of the heterocyclic rings, R represents a residue of the anthraquinone series, x stands for 1 or 2, while n stands for a number not less than 4. The more important representatives of these have the following general formula:

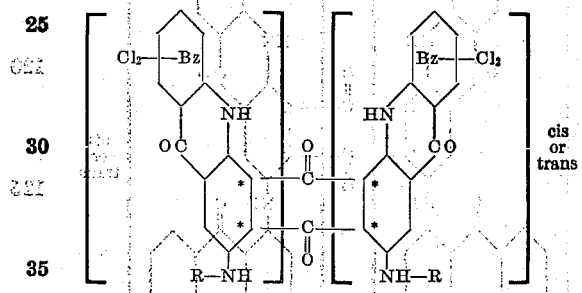

wherein R is a residue of the anthraquinone series, which may contain additional chromophoric groups such as the benzoyl-amino group, while *,* indicate the positions of attachment of the CO groups, and which may be named generically vis-a-vis-α,α-bisanthraquinonyl imino-Bz-halogen-α, α-anthraquinone-diacridones. These novel intermediates may be prepared, for instance by condensing with an amino compound of the type H₂N—R, R signifying a residue of the anthraquinone series, and in the presence of a copper salt and an acid binding agent, a polyhalogen 1,2,5,6- or 1,2,8,7-anthraquinone-diacridone.

We have now found that these novel halogenated anthraquinonyl-imino-anthraquinone-acridone compounds, although valuable dyestuffs in themselves, may be further condensed to give vat dyestuffs of different color and qualities. More particularly, we found that when said anthrimide-acridone compounds are heated with metallic halides such as aluminum chloride, zinc chloride, ferric chloride and the like, the said compounds are converted into novel and very valuable dyestuffs of generally brown shades. In this reaction evidently a ring is formed about and involving the imide (—NH—) group; however, it is not conclusive whether the product is an acridine or a carbazole compound. In analogous reactions in the art involving the heating of an anthrimide with a metallic chloride, the authorities seem to disagree sharply as to the nature of the ring formed. Some believe that the ring is of an acridine nature, involving the N atom from the imide group, and the adjacent meso C atom of one of the anthraquinone nuclei. Other authorities, however, insist that the ring is of a carbazole nature involving the N atom of the imide group, and the adjacent beta C atom of the anthraquinone nucleus. In view of this uncertainty as to the precise nature of the ring formed, we shall hereinafter refer to our condensation products merely as ring-closed condensation products of the respective halogenated anthraquinonyl-imino-anthraquinone-diacridones.

Without limiting our invention to any particular procedure, the following examples are given to illustrate our preferred mode of operation. Parts given are parts by weight.

Example 1

40 parts of aluminum chloride (anhydrous) and 60 parts of sodium chloride are melted together and heated to about 170° C., and into this melt are introduced 10 parts of Bz,Bz-tetrachloro-4,5-di - α - anthraquinonylamino - 1,2,8,7-anthraquinone-diacridone. (Example 1 of copending application Serial No. 575,477. The formula of the initial material is most probably:

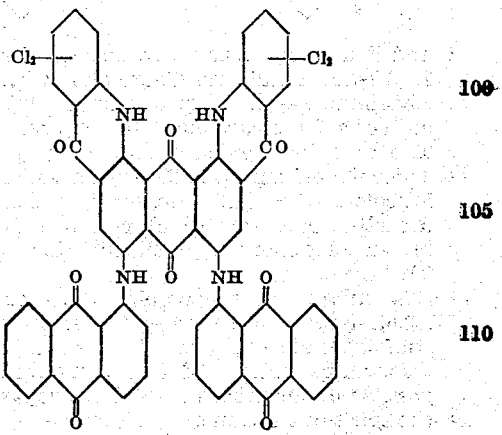

and it may be prepared by reacting hexachloro-1,2,8,7-anthraquinone-diacridone with α-amino-anthraquinone in the presence of sodium carbonate and cuprous chloride.) The mixture is raised in temperature to about 180° C., and held at this temperature for about 1 hour. The melt is now poured into 1000 parts of hot water, stirred well, filtered, washed with hot water until free of acid, and dried. The product is a black powder, insoluble in water, dilute acid or dilute alkali. It is practically insoluble in hot nitrobenzene or dichloro-benzene. It is soluble in concentrated sulfuric acid with a reddish-bordeaux color, and is precipitated therefrom upon dilution with water in khaki colored flocks. It is readily soluble in the sodium-hydrosulfite vat, from which cotton is dyed a blackish color, changing to khaki upon treatment with the usual oxidizing agents.

In the above example the fused mixture of aluminum chloride and sodium chloride may be replaced by other metallic chlorides with equally successful results. For instance, 50 parts of zinc chloride may be used, its fusion temperature being lowered by addition of a small amount of water.

*Example 2*

The procedure is the same as in Example 1, except that in lieu of the halogenated-trianthrimide therein specified, here 10 parts of Bz,Bz-tetrachloro-4,5-di-(5-benzoylamino-1-anthraquinonylamino)-1,2,8,7-anthraquinone-diacridone are used. (Example 4 of copending application Serial No. 575,477. The formula of the initial material is most probably:

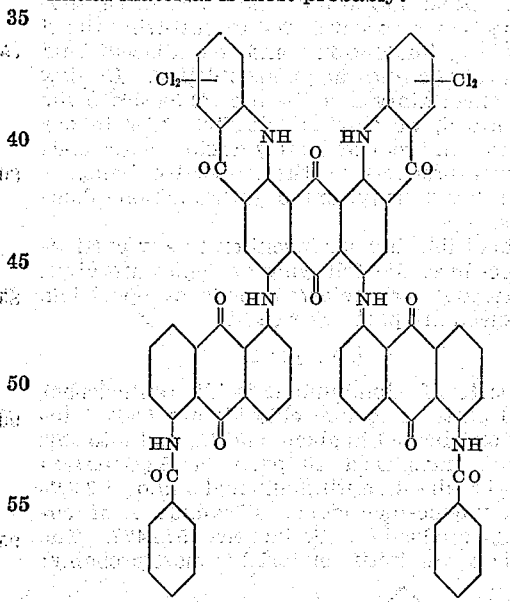

and it may be prepared by reacting hexachloro-1,2,8,7-anthraquinone-diacridone with 5-benzoylamino-1-amino-anthraquinone in the presence of sodium carbonate and cuprous chloride.) The resulting condensation product dissolves in concentrated sulfuric acid with a dull bluish-violet color. It is readily soluble in the sodium-hydrosulfite vat, from which cotton is dyed a red-brown color changing upon oxidation to a yellowish-brown.

If, in the above examples, the corresponding 1,2,5,6-isomers are used as initial material, dyestuffs of analogous properties are obtained.

It will be understood that many variations are possible in our procedure without departing from the spirit of the same.

In the claims below, it should be understood that where we claim new products, dyestuffs, or articles of manufacture, we mean to include these bodies not only in substance but also in whatever state they exist when applied to material dyed, printed, or pigmented therewith.

We claim:

1. The process of producing vat dyestuffs which comprises condensing by the aid of a metal halide condensing agent a polyhalogenated α-anthraquinonyl-imino derivative of an α,α-anthraquinone-diacridone containing not less than 4 atoms of halogen per molecule.

2. The process of producing vat dyestuffs which comprises heating with a metal halide condensing agent a halogenated anthrimide-acridone body of the following general formula:

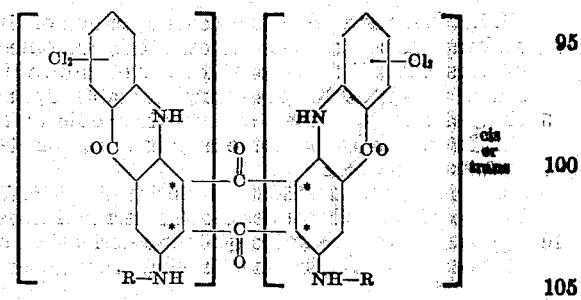

wherein R stands for a radical of the anthraquinone series, and wherein *,* indicate the positions of attachment of the CO groups.

3. The process of producing vat dyestuffs which comprises heating with a metal halide condensing agent a halogenated anthrimide-acridone body of the following general formula:

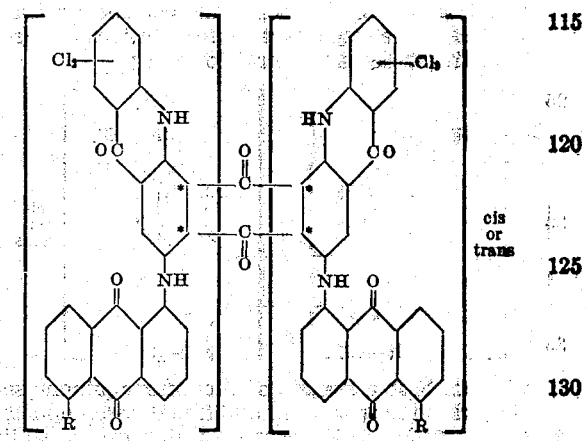

wherein R stands for hydrogen or an aroyl-amino group of the benzene series, and wherein *,* indicate the positions of attachment of the CO groups.

4. The process of producing a vat dyestuff which comprises heating with a metal halide condensing agent Bz,Bz-tetrachloro-4,5-di-α-anthraquinonylamino-1,2,8,7-anthraquinone-diacridone.

5. The process of producing a vat dyestuff which comprises heating with a metal halide condensing agent Bz,Bz-tetrachloro-4,5-di-(5-benzoylamino-1-anthraquinonylamino)-1,2,8,7-anthraquinone-diacridone.

6. A ring closed condensation product of a polyhalogenated α-anthraquinonyl-imino derivative of an α,α-anthraquinone-diacridone containing not less than 4 atoms of halogen per molecule.

7. Ring-closed condensation products of halogenated anthrimide-acridone bodies which before condensation have the following general formula:

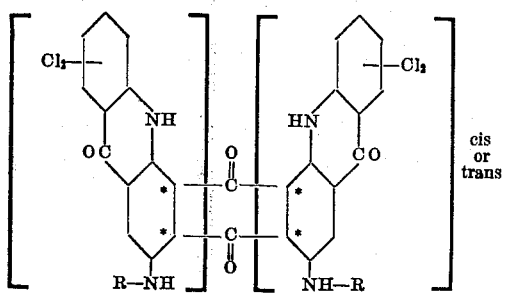

wherein R stands for a radical of the anthraquinone series, and wherein *,* indicate the positions of attachment of the CO groups.

8. Ring-closed condensation products of halogenated anthrimide acridone bodies which before condensation have the following general formula:

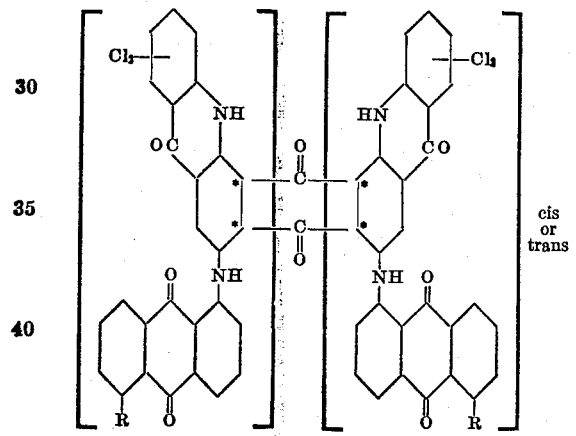

wherein R stands for hydrogen or an aroyl-amino group of the benzene series and wherein *,* indicate the positions of attachment of the CO groups.

9. A ring-closed condensation product of Bz,Bz-tetrachloro-4,5-di-α-anthraquinonylamino-1,2,8,-7-anthraquinone-diacridone; said dyestuff being soluble in concentrated sulfuric acid with a reddish-bordeaux color and dyeing cotton from an alkaline hydrosulfite vat a blackish color, which changes to khaki upon aeration or oxidation.

10. A ring-closed condensation product of Bz,Bz-tetrachloro-4,5-di-(5 - benzoylamino-1-anthraquinonylamino)-1,2,8,7 - anthraquinone - diacridone; said dyestuff being soluble in concentrated sulfuric acid with a dull bluish-violet color and dyeing cotton from an alkaline hydrosulfite vat a red-brown color, which changes to yellowish brown upon aeration or oxidation.

11. The process of producing a vat dyestuff which comprises condensing by the aid of aluminum chloride a halogenated anthraquinonylimino derivative of anthraquinone-diacridone having the general formula:

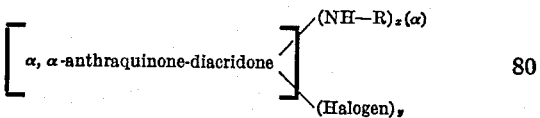

wherein α,α refer to the positions of the NH groups of the heterocyclic rings, (α) refers to the position of the groups —(NH—R)$_x$, R represents a radical of the anthraquinone series, $x$ stands for 1 or 2, while $y$ stands for a number not less than 4.

12. The process which comprises heating in an aluminum-chloride-sodium-chloride melt at a temperature of about 170° to 180° C. a compound of the general formula:

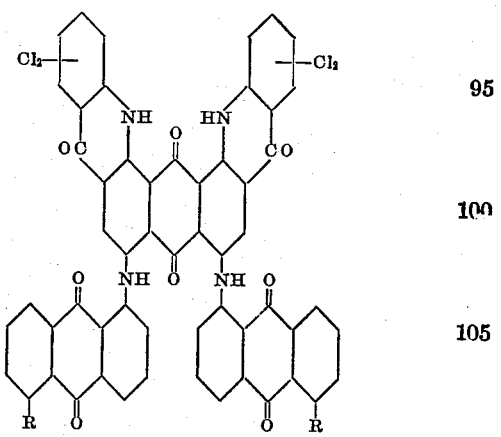

wherein R stands for hydrogen or a benzoyl-amino group, whereby to ring close said compound, and recovering the dyestuff formed.

13. The process which comprises heating in an aluminum-chloride-sodium-chloride melt at a temperature of about 170° to 180° C. a compound of the general formula:

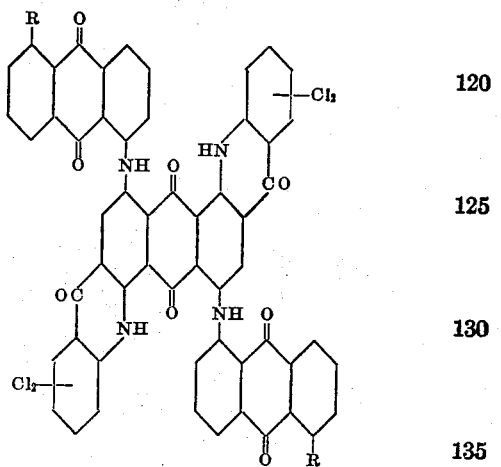

wherein R stands for hydrogen or a benzoyl-amino group, whereby to ring close said compound, and recovering the dyestuff formed.

IVAN GUBELMANN.
ROBERT J. GOODRICH.
WILLIAM DETTWYLER.